O. FRANKMAN.
DRIVING AND RUNNING GEAR FOR AGRICULTURAL MACHINES AND THE LIKE.
APPLICATION FILED AUG. 14, 1919.

1,337,510.

Patented Apr. 20, 1920.
2 SHEETS—SHEET 1.

Inventor
Olof Frankman
by
Attorney

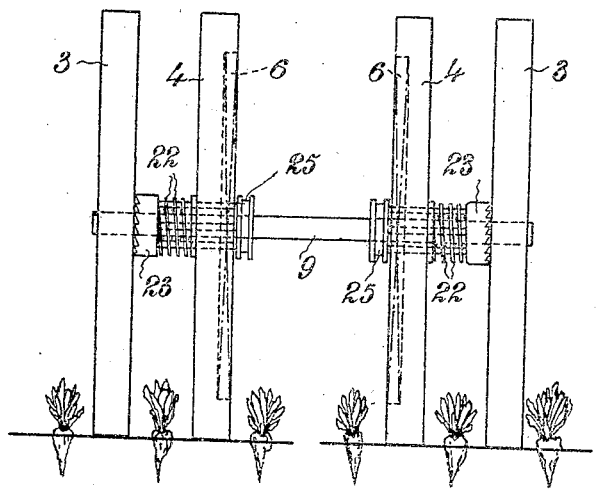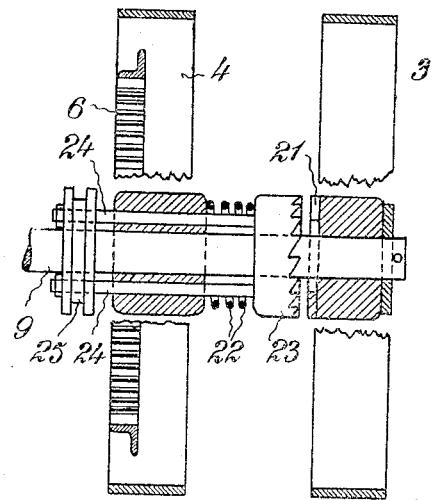

UNITED STATES PATENT OFFICE.

OLOF FRANKMAN, OF MALMÖ, SWEDEN.

DRIVING AND RUNNING GEAR FOR AGRICULTURAL MACHINES AND THE LIKE.

1,337,510. Specification of Letters Patent. Patented Apr. 20, 1920.

Application filed August 14, 1919. Serial No. 317,573.

*To all whom it may concern:*

Be it known that I, OLOF FRANKMAN, a citizen of Sweden, residing at Malmö, Sweden, have invented new and useful Improvements in Driving and Running Gear for Agricultural Machines and the like, of which the following is a specification.

The invention relates to driving and running gears for agricultural machines, such as beet harvesting machines and the like.

As the dimensions and the weight of such machines are increased, especially in motor driven machines, the necessary width of the wheel rim is also increased in such a way that the wheels cannot pass between the beet rows, when the former are given a width necessary for carrying the machine on a loose ground. This disadvantage may be avoided by using two narrower wheels instead of one broader, said narrower wheels being placed at such a distance from each other that they pass between three adjacent plant rows. When such twin wheels are used, the growing plants will not be spoiled, but simultaneously great difficulties will arise in the handling of the machine, as it will be very difficult to turn the same around and the machine will require a very large space for turning in order to prevent the wheels from digging into the ground. In order to avoid these difficulties the driving wheels ought to be connected with each other and with the driving mechanism in a certain manner as indicated below.

Figure 1:
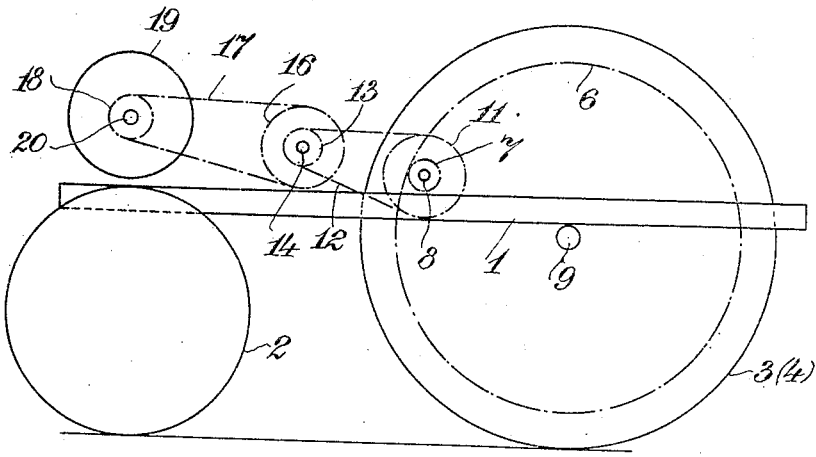
Figure 2:
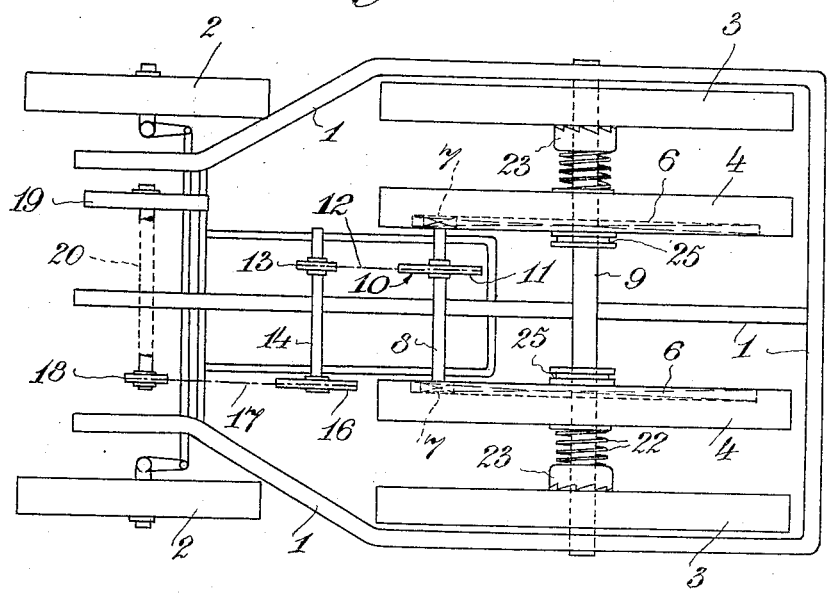

The invention is illustrated in the accompanying drawings. Figures 1 and 2 show one form of the invention in elevation and plan. Fig. 3 is an end view and Fig. 4 is a section through the hub portions of the wheels.

According to the invention the machine frame 1 is carried partially by the steering wheels 2 but substantially by two wheels on each side of the frame, the outer wheel 3 and the inner wheel 4. The distance between the outer and inner wheel at both sides is such that the central planes of these wheels perpendicular to the axle coincide with the central lines in the interspaces between three adjacent plant rows. The distance between the two inner wheels 4 corresponds to the number of plant rows to be worked at by the passing machine. This distance may vary according to the capacity of the machine, the distance shown in the drawing corresponding to two plant rows. (Fig. 3).

The wheels 4 are provided with rims of gear wheels 6 engaging with pinions 7 mounted on the axle 8 in the center of the machine. All the driving and running wheels 3, 4 are loosely mounted on the common shaft 9 and in order to permit the wheels 3 and 4, on one side, to rotate in relation to the wheels 3 and 4, on the other side, to facilitate the turning of the machine a differential gear 10 is mounted on the axle 8 between the wheels 7, the housing of said differential gear being provided with a sprocket 11 for a chain 12 running over a driving wheel 13 placed on an intermediate shaft 14 mounted in the frame. The shaft 14 is mounted in the central portion of the frame and has a sprocket 16 mounted thereon for a chain 17 running over a chain wheel 18 mounted on the motor shaft 20 which is provided with a flywheel 19. Thus by means of the differential gear 10, all driving wheels are independent of each other, though they coöperate to propel the machine, and turning of the same can take place in the smallest possible space.

As the working machinery when turning is almost without exception idle and parts working in the ground are disengaged, it will be evident that less power is necessary for propelling the machine during the turning than during working. Consequently all of the wheels 3, 4 need not serve as driving wheels during the turning movement. Therefore the mechanical devices may be somewhat simplified without jeopardizing the result wished, and such a simplified device is shown in detail in Figs. 3 and 4.

A coupling 21 is provided on the hub portion of the outer wheels 3, and on the shaft 9 is a slidable part 23 of the coupling. This part 23 may be acted upon by a spring 22 and is in a suitable way connected with the hub of the wheels 4, so that it takes part in the rotation of these wheels. In the drawing this connection is shown as consisting of bars 24 going through the hubs of the wheels 4. The bars 24 are at one end connected with the part 23 of the coupling and at the other ends on the inside of the wheels 4 with a grooved disk 25, by means of which the coupling can be controlled. These details may of course be varied in many different ways. When the machine is driven in the ordinary way the couplings 21, 23 are thrown in gear and the two wheels on the same side of the machine serve as driving wheels. When turning the couplings are thrown out of gear, and then the wheels 3 are free to rotate in either direction and do not serve for propelling but only for carrying the machine. When turning the wheels 4 are of course with regard to the rotation independent of each other by means of the differential gear 11 on the shaft 8.

In very heavy machines or when the distance between the plant rows is small more than two wheels may be used at each side, and it is not necessary that the central planes of the wheels coincide with the center lines of the adjacent rows, but for instance with the center line between every other row.

What I claim is:—

1. A mechanism of the character described, consisting of a frame, a pair of ground wheels at the forward end of said frame, a pair of ground wheels at the rear end of said frame, a pair of wheels spaced away from said rear wheels, individual clutches for each set of rear wheels, means for operating said clutches and driving means for said wheels.

2. A mechanism of the character described, consisting of a frame, a front axle in said frame, ground wheels on said axle, a rear axle in said frame, two pairs of wheels on said axle in spaced relation, clutch mechanisms for operatively connecting either of the inner wheels with the outer wheels, a driving means, and gear and chain connections between the driving means and wheels.

In testimony whereof I have signed my name to this specification in the presence of two subscribing witnesses.

OLOF FRANKMAN.

Witnesses:
 FRED FLERON,
 HJ. BRANZELL.